United States Patent
Rona et al.

(10) Patent No.: US 7,114,707 B2
(45) Date of Patent: Oct. 3, 2006

(54) CARBONATION SYSTEM AND METHOD

(75) Inventors: Gyorgy Rona, God (HU); Janos Oscenas, Nagymaros (HU); Scott Nicol, 3221 N. Dover Rd., Stow, OH (US) 44224

(73) Assignee: Scott Nicol, Stow, OH (US)

( * ) Notice: Subject to any disclaimer, the term of this patent is extended or adjusted under 35 U.S.C. 154(b) by 37 days.

(21) Appl. No.: 10/473,498

(22) PCT Filed: Apr. 5, 2002

(86) PCT No.: PCT/US02/10916

§ 371 (c)(1),
(2), (4) Date: Sep. 30, 2003

(87) PCT Pub. No.: WO02/081067

PCT Pub. Date: Oct. 17, 2002

(65) Prior Publication Data

US 2004/0124548 A1    Jul. 1, 2004

Related U.S. Application Data

(60) Provisional application No. 60/282,232, filed on Apr. 6, 2001.

(51) Int. Cl.
*B01F 3/04* (2006.01)

(52) U.S. Cl. .................. 261/42; 261/43; 261/64.3; 261/65; 261/91; 261/119.1; 261/DIG. 7

(58) Field of Classification Search ............ 261/42, 261/43, 44.1, 50.3, 51, 53, 59, 60, 64.3, 65, 261/91, 92, 119.1, DIG. 7
See application file for complete search history.

(56) References Cited

U.S. PATENT DOCUMENTS

| | | | | |
|---|---|---|---|---|
| 3,398,550 | A | * | 8/1968 | Lents .......................... 62/179 |
| 3,825,111 | A | * | 7/1974 | Pipkins .................... 206/213.1 |
| 4,317,731 | A | * | 3/1982 | Roberts et al. .............. 210/741 |
| 4,660,740 | A | | 4/1987 | Brandon, Jr. et al. |
| 4,719,056 | A | | 1/1988 | Scott |
| 4,940,164 | A | | 7/1990 | Hancock et al. |
| 5,139,708 | A | | 8/1992 | Scott |
| 5,160,461 | A | * | 11/1992 | Burrows ................... 261/140.1 |
| 6,182,949 | B1 | * | 2/2001 | Mobbs ........................ 261/34.1 |
| 6,234,349 | B1 | * | 5/2001 | Bilskie et al. ................. 222/67 |
| 6,449,966 | B1 | * | 9/2002 | Bethuy et al. ................ 62/139 |
| 6,644,343 | B1 | * | 11/2003 | Bethuy et al. .............. 137/392 |

FOREIGN PATENT DOCUMENTS

| | | |
|---|---|---|
| CN | 2068151 U | 12/1990 |
| DE | 642137 | 2/1937 |
| JP | 07-332821 | 12/1995 |

* cited by examiner

*Primary Examiner*—Scott Bushey

(74) *Attorney, Agent, or Firm*—Hahn Loeser & Parks LLP; Michael H. Minns

(57) ABSTRACT

The water carbonation method and apparatus of the present invention consists of a square mixer within a carbonated chamber. The mixer is partially filled with water. Carbon dioxide is then added above the level of water. A rotating member attached to the mixing motor then mixes the water and carbon dioxide to from a carbonated solution. Varying the time for which the carbonation operation is carried on may vary the degree of carbonation. After the specified carbonation cycle, excess carbon dioxide is then relieved through an exhaust solenoid and the remaining carbonated solution is released through the dispensing solenoid into a cup.

24 Claims, 10 Drawing Sheets

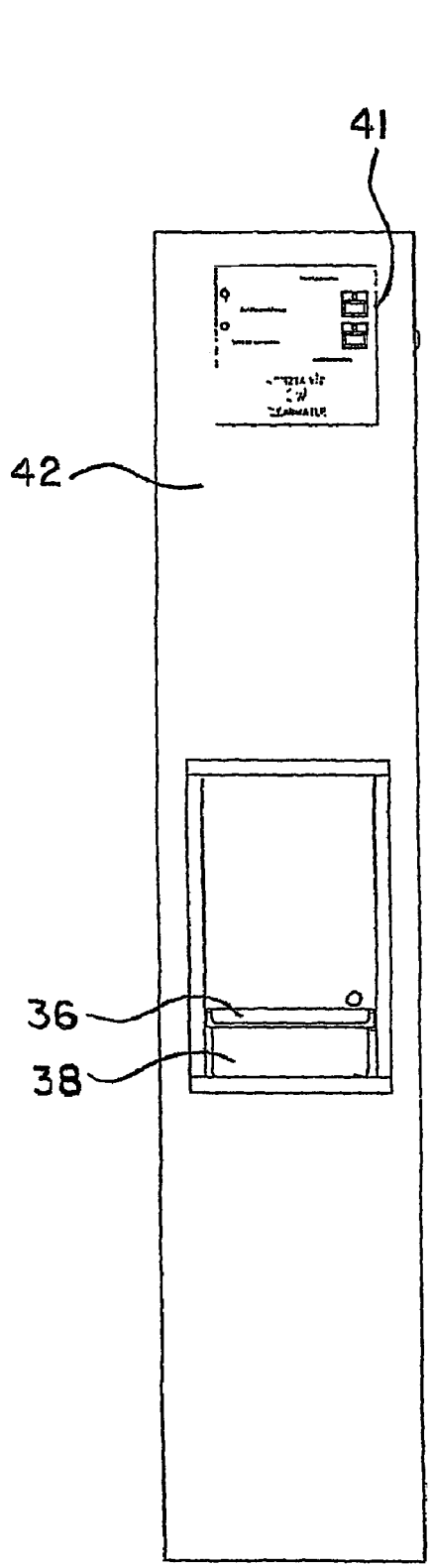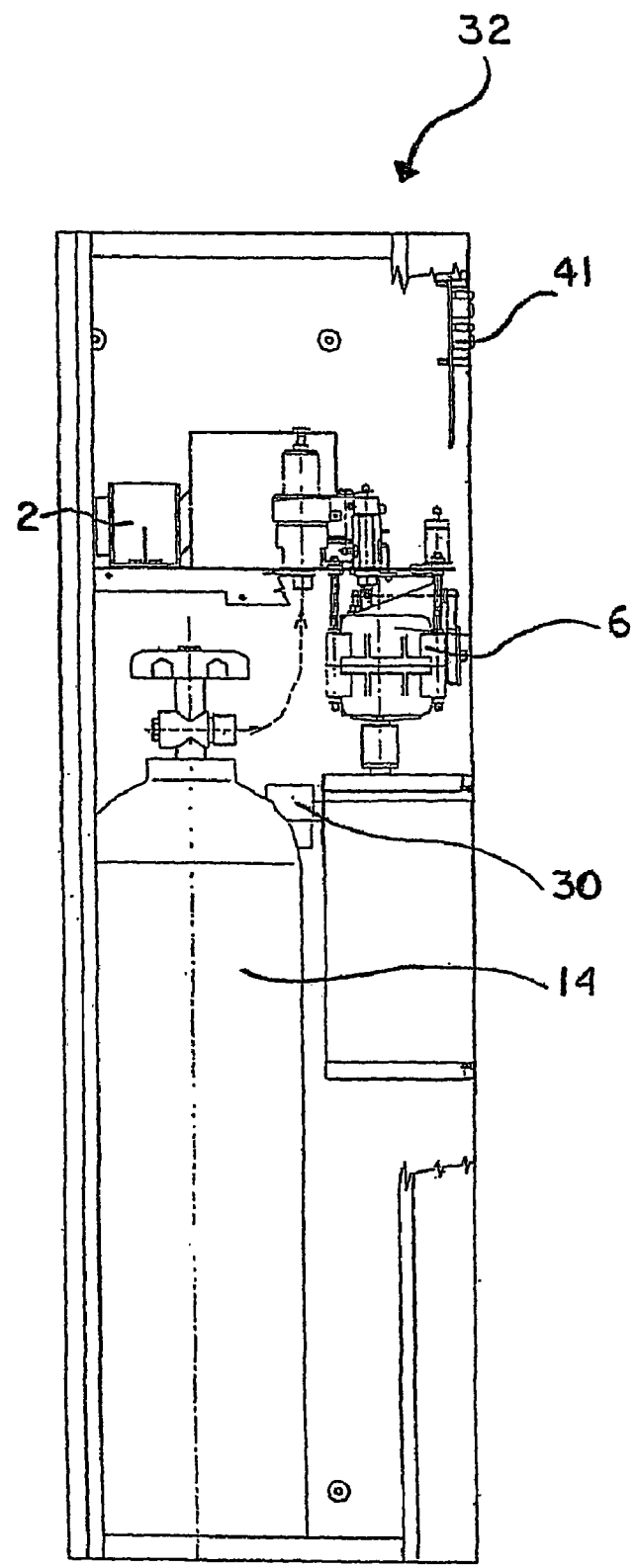
FIG. 2A  FIG. 2B

CARBONATION SYSTEM AND METHOD

This application claims priority from U.S. Provisional Patent Application Ser. No. 60/282,232, filed Apr. 6, 2001.

TECHNICAL FIELD

The present invention relates to a system and method of carbonating liquids such as in association with a water cooler. More particularly, the present invention is directed to a carbonation system and method that allows effective carbonation to a desired degree.

BACKGROUND OF THE INVENTION

Various methods of carbonating water are known in the prior art. One method, involves injecting carbon dioxide into the water. This injection of carbon dioxide forms bubbles that float up through the water. Carbon dioxide in the bubbles is then absorbed into the water. This method has been widely used in relatively small carbonating apparatuses for home use and operable for dispensing carbonated water in quantities sufficient to form one drink. The main problem with this method is that it is only effective if relatively high pressures are used in the carbonation chamber.

Another method involves spraying or atomizing the water into an atmosphere of carbon dioxide gas. In this method, a carbonation chamber is pre-filled with carbon dioxide and water is added to the chamber by spraying. Thus, carbon dioxide is dissolved into the water droplets, the water droplets then carry the carbon dioxide into the body of water. The problem with this method is that a long period of time is required to achieve sufficient carbonation and it also requires a relatively high level of pressurization in the carbonation chamber.

Another method, described in U.S. Pat. No. 4,719,056, partially fills a chamber with water, adds carbon dioxide gas in the space above the water and then agitates the water with a horizontal rotating paddle having blades that project above the water into the carbon dioxide gas space.

Consequently, there is a need for a carbonation system and method, which is faster and more efficient. There is also a need for a liquid cooler, such as a water cooler, which includes the capacity to carbonate liquid beverages. It would also be advantageous to allow carbonation of a liquid to a desired degree, and to allow carbonation of such beverages without requiring high pressures to be used in the carbonization chamber.

SUMMARY OF THE INVENTION

The system and method disclosed in the present invention comprise a carbonation chamber partly filled with water. Carbon dioxide is then added above the level of water. A rotating member then mixes the water and carbon dioxide to form a solution. This method causes the water and carbon dioxide to form a solution of carbonated water.

The carbonated water cooler of the present invention further comprises a unique valve system for transferring and mixing of fluids in the desired sequence and volumes. Further aspects and advantages of the invention will become apparent upon a reading of the description associated with an embodiment thereof, in conjunction with the drawings.

BRIEF DESCRIPTION OF THE DRAWINGS

FIGS. 2A and 2B are front and side partial cross sectional views respectively, of one embodiment of the carbonation system according to the present invention;

DETAILED DESCRIPTION OF THE INVENTION

Figure 1:
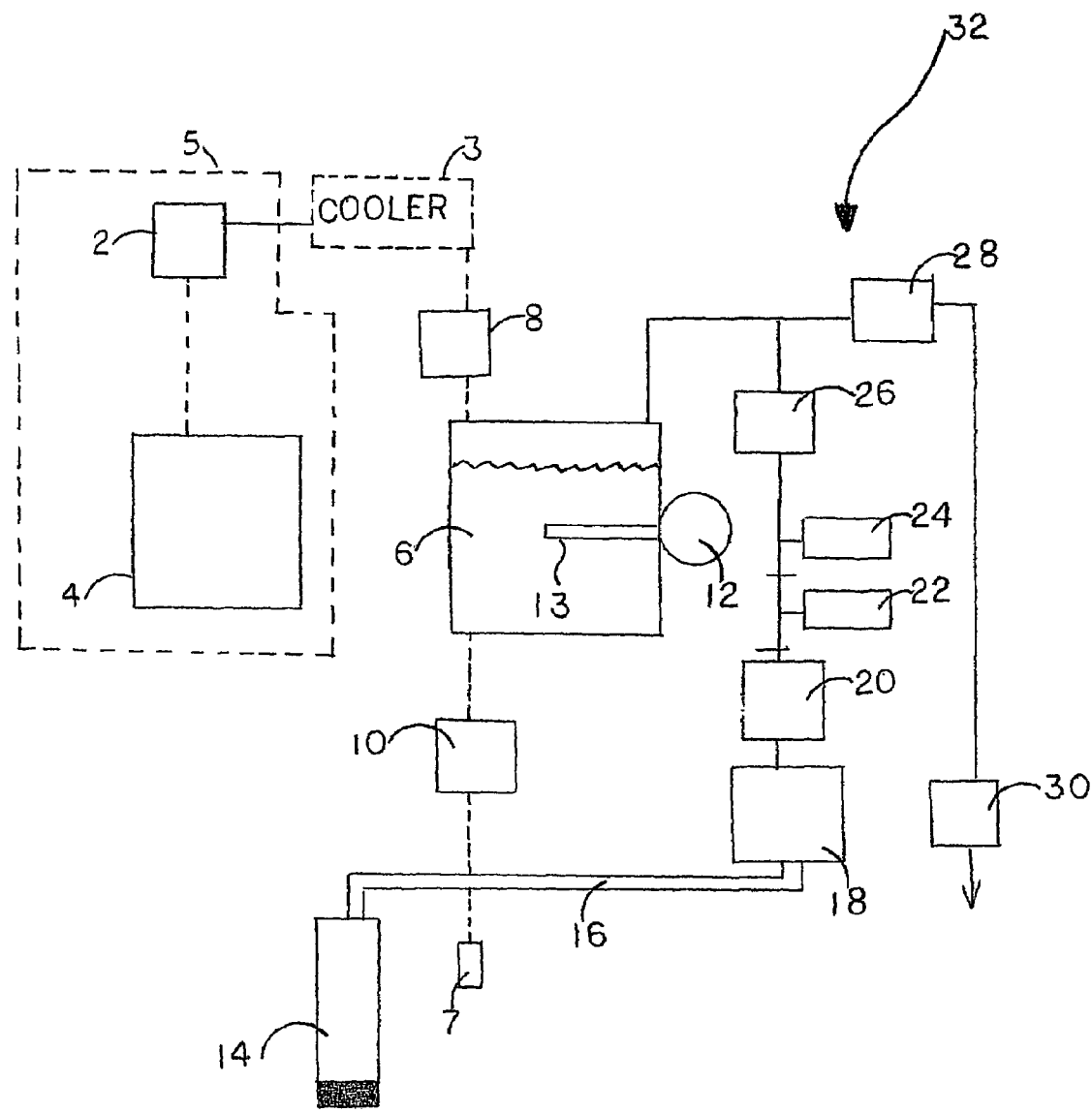
FIG. 1 is a block diagram of the carbonated water cooler according to the present invention.

Turning now to FIG. 1, there is shown a block diagram of the carbonation process according to one embodiment of the present invention. The carbonation system and method may be used with existing or originally manufactured water coolers or other beverage dispensers or in other applications as desired. The system allows existing water coolers to be easily retrofitted to allow selective carbonation. Similarly, the system could be used with other liquid dispensers in a similar fashion. In the example of a water cooler, water from a tank is cooled in the cooler 3 until dispensing is desired. Upon a user requesting a carbonated drink, the system is initiated by a user depressing a switch or another control mechanism. A control system 5 operates the system to cause the opening of a water filling solenoid 8. The control system 5 may comprise an electronic control circuit board 4 and an electrical transformer 2 for conversion of power to control the carbonation system. The solenoid 8 selectively allows water, or another liquid, to enter an upper part of the mixing assembly unit or carbonation chamber 6 for about 6 seconds. A vent 142 in the carbonation chamber 6 permits air in the unit to be vented to the atmosphere while the carbonation chamber 6 is being filled with water and permits air to enter when carbonated liquid is dispensed from carbonation chamber 6. Once the carbonation chamber 6 is filled to the appropriate level 17 with water, the water filling solenoid 8 is then closed to prevent additional water from entering the carbonation chamber 6, or water from re-entering the conduit to the cooler 3. If the solenoid 8 were not closed, pressure in the carbonation chamber 6 could force water out of the carbonation chamber 6.

Next, the carbon dioxide filling solenoid valve 20 opens, allowing carbon dioxide from a carbon dioxide storage cylinder 14 to enter the carbon dioxide connecting tube 16 and then to the carbonation chamber 6 via a pressure regulator 18. The pressure regulator 18 can be selectively adjusted to provide for the introduction of the desired amount of carbon dioxide. A pressure control switch 22 senses the gas pressure in the carbonation chamber 6, so that when it reaches a predetermined level or volume, gas solenoid valve 20 is de-energized to stop the flow of carbon dioxide gas into the carbonation chamber 6. A pressure safety valve 24 can be provided to automatically reduce over-pressure (~10 bar) in carbonation chamber 6. A non-return valve 26 may also be provided if desired, which acts to stop carbon dioxide or liquid from re-entering tube 16 or being forced out of the carbonation chamber 6 due to pressure in the carbonation chamber 6.

In this manner, carbon dioxide is introduced in the space above the level 17 of the liquid, such as water, disposed in the carbonation chamber 6. A mixer, schematically shown at 13, may be provided in association with a mixing motor 12, within the carbonation chamber 6. The mixing motor 12 is selectively energized to activate the mixer 13; which mixes the carbon dioxide into the water or other liquid. The action of the mixer 13 forces the carbon dioxide gas in the space above the water level down into the water. As will hereafter be described in more detail, the configuration of the mixer 13 and the shape of the carbonation chamber unit 6 allow for intense agitation such that the liquid is uniformly carbonated. Further, the degree of carbonation may be selectively varied by varying the time for which the mixer 13 is driven and/or by varying the amount carbon dioxide gas introduced by controlling the pressure of the atmosphere containing carbon dioxide in the space in the carbonation chamber 6 above the water level 17.

As an example, the carbon dioxide gas filling solenoid 20 opens and after approximately 0.5 seconds, operation of the mixing motor 12 is initiated. Mixing and carbonation may be performed for about seven seconds for producing about 1.9 dl of a more highly carbonated beverage (6 gr/l), or about four seconds for producing about 1.9 dl of a lightly carbonated beverage (4 gr/l). As carbonation progresses, the water absorbs gas from the space above the water level 17 in the carbonation chamber 6 so that gas pressure reduces. This pressure reduction is sensed by the pressure control switch 22, which then acts to open the gas solenoid valve 20 and allow more carbon dioxide into the carbonation chamber 6, thereby maintaining a proper pressure of carbon dioxide in the carbonation chamber 6. Subsequently, the control system 5 may introduce a damping period of about two seconds as an example, allowing the carbonated liquid to settle somewhat in the carbonation chamber 6. After the damping period, a cut off or exhaust solenoid valve 28 is then opened to release any excess carbon dioxide through a silencer 30, thereby relieving pressure in the carbonation chamber 6. Once pressure is relieved, the carbonated liquid dispenser solenoid 10 is operated to release the carbonated liquid mixture into a cup 7.

Figures 3A, 3B:
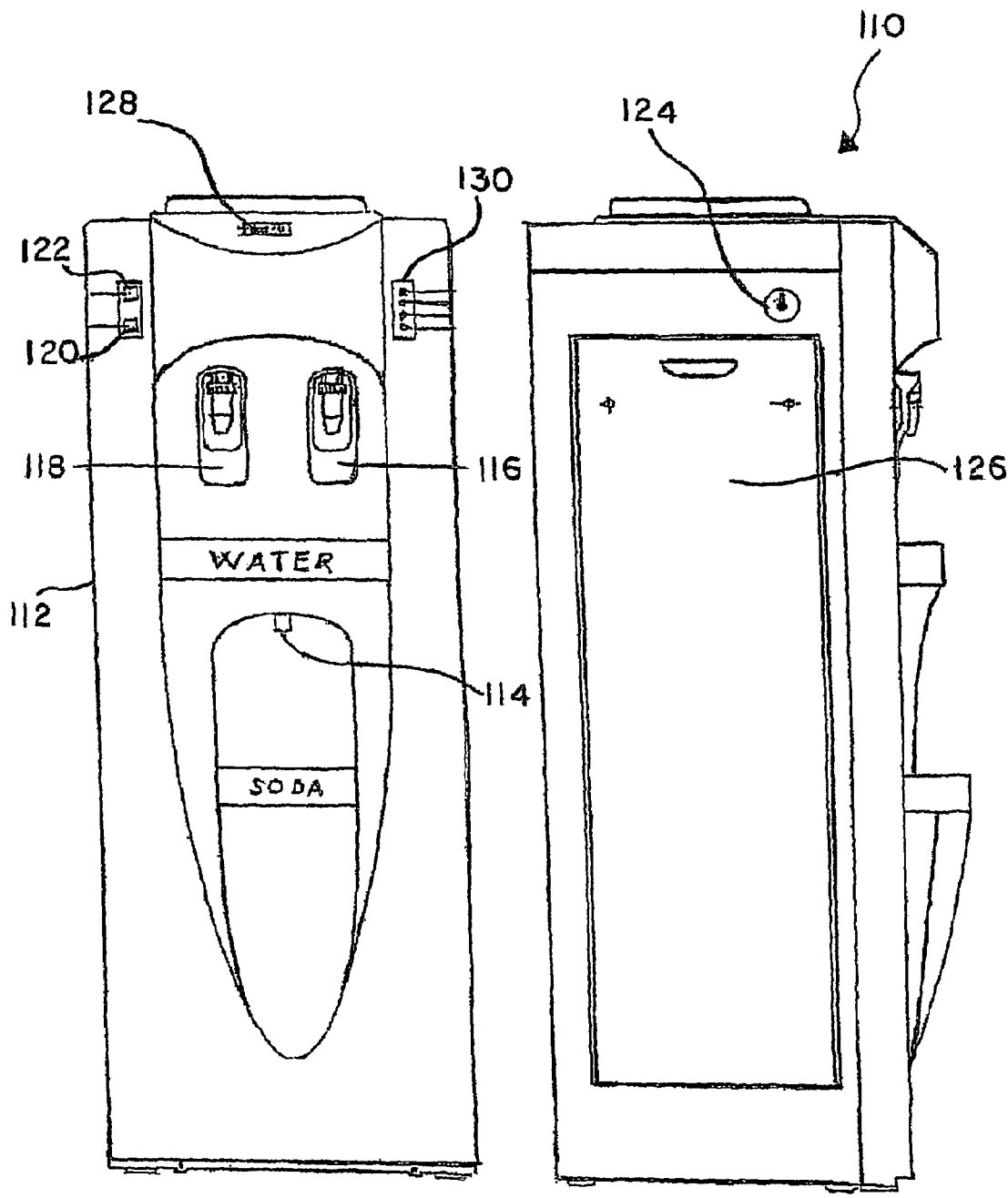
FIGS. 3A and 3B are front and side views of a second embodiment of the carbonation system of the present invention.

An embodiment of the carbonation system as shown in FIG. 1 is shown in FIGS. 2A and 2B. The carbonation system 32, may be used in conjunction with a water cooler as an example, and thus may be designed to be selectively coupled to a cooler for use. In such an embodiment, a separate housing 42 may be provided, which may be configured to aesthetically match any type of water cooler, or could be otherwise configured. Alternatively, the carbonation unit 32 could be formed integral with a water cooler such as shown in the embodiment of FIGS. 3A and 3B, so as to make both carbonated and non-carbonated liquids available in an originally manufactured unit. In the embodiment of FIG. 2, the housing 42 may further be of a size to allow a significantly larger carbon dioxide tank to be housed therein, such that replacement of the tank is only required at relatively longer intervals depending on use. The carbon dioxide storage in previous apparatus has been limited in size, requiring special containers and more maintenance and replacement, whereas the size of housing 42 allows standard size carbon dioxide tanks or containers to be used. For example, the housing 42 may hold a 5 kg carbon dioxide cylinder 14 inside. The housing 42 may be constructed of metal, plastic or other suitable materials. The housing 42 may have multiple openings formed therein to allow the lead electric cable and water junction pipe to pass through and connect to appropriate systems within housing 42. Additionally, the housing 42 makes it easy to mount various components such as the carbonation chamber 6, the silencer 30, the control circuit board 4, as well as the carbon dioxide cylinder 14. There is also a cup holding area, which contains a drip tray 38 and drip tray lid 36. A control panel 41 may be provided on the front of the housing 42, comprising a plurality of user controlled buttons, switches or the like for selective operation of the carbonation system. For example, on control panel 41 may be provided means for increasing and decreasing the amount of carbonation within the carbonated water, such as switches.

An alternative embodiment of an integrated carbonation system is set forth in FIGS. 3A and 3B, the system being shown generally at 110. Carbonation system 110 includes a housing 112, a carbonated liquid dispenser 114, a cold liquid dispenser 116 and a warm liquid dispenser 118. Having the capability to dispense cold, warm and carbonated water as an example, increases the utility of carbonation system 110 and allows for servicing a variety of consumer's needs. Carbonation system 110, preferably also includes a control panel similar to the embodiment of FIG. 2, with means for increasing and decreasing the amount of carbonation within the carbonated water, such as switches 120 and 122 for increasing or decreasing the carbonation level. It is also preferred, although not necessary, to include a water temperature display 128. Furthermore, in this embodiment, there is provided an indicator panel 130 which provides means for indicating when the system is operating, when water is being heated or cooled, or when there is a carbonation error, such as if no water or liquid is introduced into the chamber, the system is out of carbon dioxide or if no pressure is formed in the mixing chamber for example.

As shown in FIG. 3B, this embodiment also preferably includes a pressure gauge 124 for indicating the pressure within carbonation chamber 6. As with embodiment 32, embodiment 110 includes an access panel 126 to allow for access to the components of carbonation system 110, within housing 112. In operation, carbonation system 110 may operate similarly to system 32 with the addition of elements for cooling and heating non-carbonated and or carbonated water or other liquids.

Figure 4:
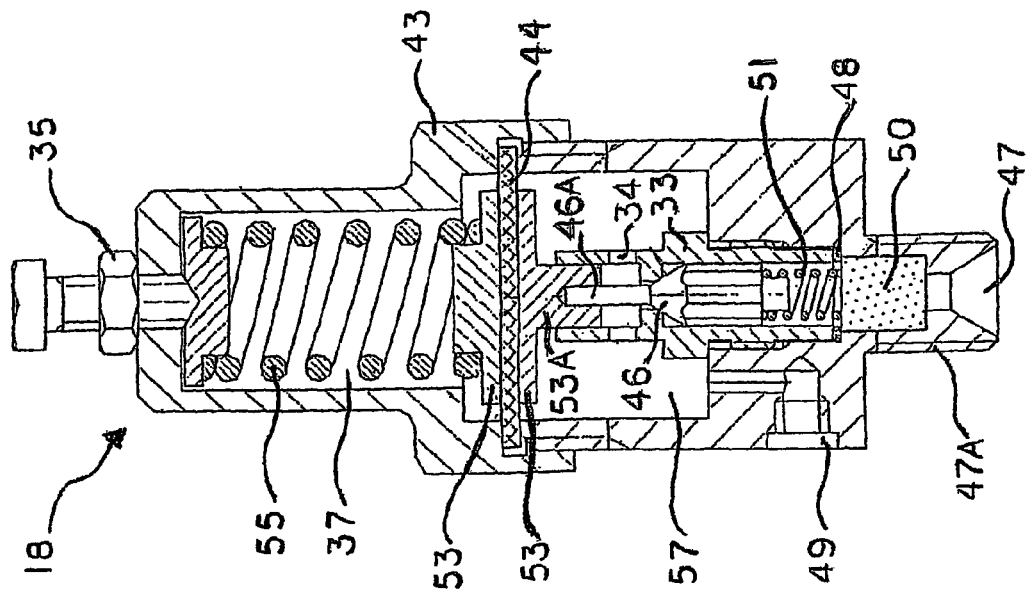
FIG. 4 is an enlarged cross-sectional view of a pressure regulator used with the carbonation system.

Turning to FIG. 4, the pressure regulator 18 as schematically shown in FIG. 1 is shown in more detail. The pressure regulator 18 allows for fast and easy installation and reliable operation. In a preferred form, the pressure regulator 18 will perform predetermined functions, comprising the supply of a predetermined amount of carbon dioxide gas at a predetermined rate throughout the mixing cycle, such as approximately 2 gr./sec. Further, the pressure regulator 18 maintains a stable and substantially uniform pressure (5 to 5.5 bar) on an output or secondary side 49, irrespective of pressure change on the input or primary side 47, which may, for example, occur in the case of a low carbon dioxide cylinder. The pressure regulator in one embodiment comprises a moveable cone valve 46, preferably fabricated from a material such as polypropylene, closing on a circular opening within the regulator 18. The flow of gas through the regulator 18 proceeds from the gas supply through a conduit coupled to the primary side 47 to a secondary side 49 through valve 46. The secondary side is then coupled to the carbonation chamber 6 through a manifold 140.

Pressure regulator 18 has a two piece housing 43 with a high pressure inlet 47 and a low pressure outlet 49. A flexible diaphragm 44, captured between the two parts of housing 43, divides the interior of housing 43 into a gas portion 57 and a spring portion 37. Spring 55 within the spring portion 37 of housing 43 exerts a first or spring force on diaphragm 44 while gas pressure in gas portion 57 of housing 43 exerts a second force or gas force on diaphragm 44 that is opposite of the spring force. A two piece actuating assembly 53 is placed on both sides of diaphragm 44. A valve seat 33, which fits into high pressure inlet 47, slidingly engages a boss 53a extending from actuating assembly 53. Valve seat 33 has at least one aperture 34 to permit gas flow from high pressure inlet 47 into the gas portion 57 of housing 43. The movable cone valve 46 fits within valve seat 33 and is biased to a closed position by spring 51. A removable bronze sinter filter 50 fits between a removable inlet fitting 47a and valve seat 33. Movable valve 46 is sized and shaped to fit through high pressure inlet 47 when inlet fitting 47a has been removed. Movable valve 46 has a needle portion 46a that extends from the movable valve 46 and into contact with actuating assembly 53. When the pressure of low pressure gas in gas portion 57 of housing 43 drops, the gas force on diaphragm 44 will drop below the spring force on diaphragm 44 allowing spring 55 to move actuating assembly 53 towards the high pressure inlet 47. The actuating assembly 53 then pushes on needle portion 46a and move movable valve 46 to an open position, against the force of spring 51. Carbon dioxide gas then flows through apertures 34 in movable valve 33. The restricted opening through which the gas flows reduces the gas pressure to the desired 5 to 5.5 bar. An adjuster 35 is provided at the top of housing 43 to adjust the spring force on diaphragm 44. The output 49 of pressure regulator 18 is connected to carbon dioxide gas solenoid valve 20.

Further, the pressure regulator 18 is also easy to install and inexpensive. The elements of the pressure regulator 18 may be fabricated simply from a material such as brass, and the components are easily assembled using simple fittings. Pressure regulation is easily calibrated by adjustment of the actuating assembly 53 or other components as desired, such as the cone shaped valve 46. Installation of the movable valve 46 is easily performed by a screw fitting 47a and sealing on the primary side is ensured by an O-ring 48 and the valve seat 33, allowing the movable valve 46 to be screwed in by hand.

Figure 5:
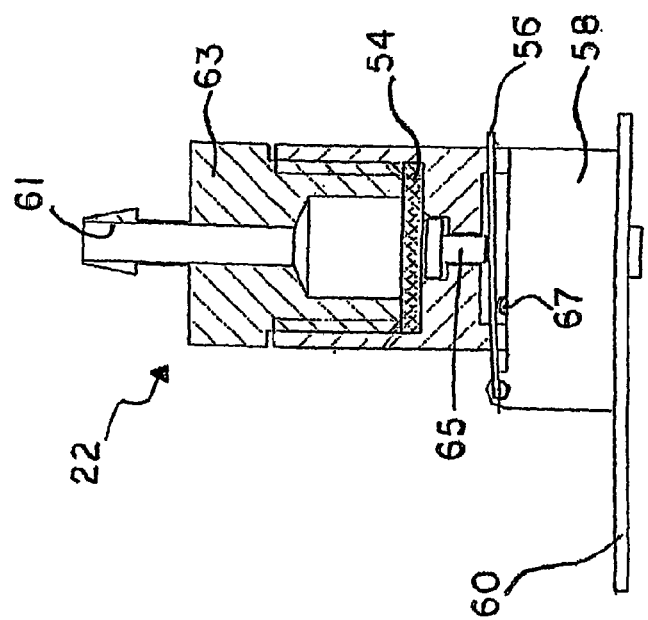
FIG. 5 is an enlarged cross-sectional view of a pressure switch used with the carbonation system.

The pressure control switch 22 as shown in FIG. 5, senses pressure in the carbonation chamber 6 in excess of a predetermined pressure, such as around 3 bar for example. Pressure switch 22 has a two piece housing 63 having a pressure inlet 61 at one end, connected via a manifold 140 (See FIG. 11) to carbonation chamber 6, and a flexible diaphragm 54 at the other end sealing gas pressure within housing 63. Pressure within housing 63 is exerted on diaphragm 54, causing deformation of diaphragm 54. Deformation of the diaphragm 54, in turn pushes a plunger 65, captured between the two pieces of housing 63, against a spring biased arm 56. Arm 56 is part of a micro-switch 58. Arm 56 presses against another plunger 67 in switch 58 and causes electrical contacts within switch 58 to change position. Preferably, switch 58 is mounted on a PCB board 60. The configuration of pressure switch 22 makes the switching force independent of the magnitude of the pressure of the gas.

In an embodiment of the invention, the safety valve 24 and non-return valve 26 are built into one unit. The safety valve 24 is set to react at a predetermined pressure, such as 10 bars for example. The non-return valve 26 prevents the back-flow of liquids and/or carbon dioxide into the pressure controller in case the carbonation chamber 6 remains under pressure while the primary pressure ceases for some reason, such as if the carbon dioxide cylinder 14 becomes unattached.

Also, there may be provided a silencer 30, which is meant to brake the high speed of gas as it is released by the exhaust valve 28 and to separate the carbon dioxide and liquid. Operation of the unit is then relatively silent and aesthetically pleasing. The carbon dioxide enters the filter, expands, and then exits through bore holes on the upper part of the silencer 30. Water is then collected at the bottom of the silencer 30 and discharged through a plastic pipe to the dripping tray 38.

Figure 6:
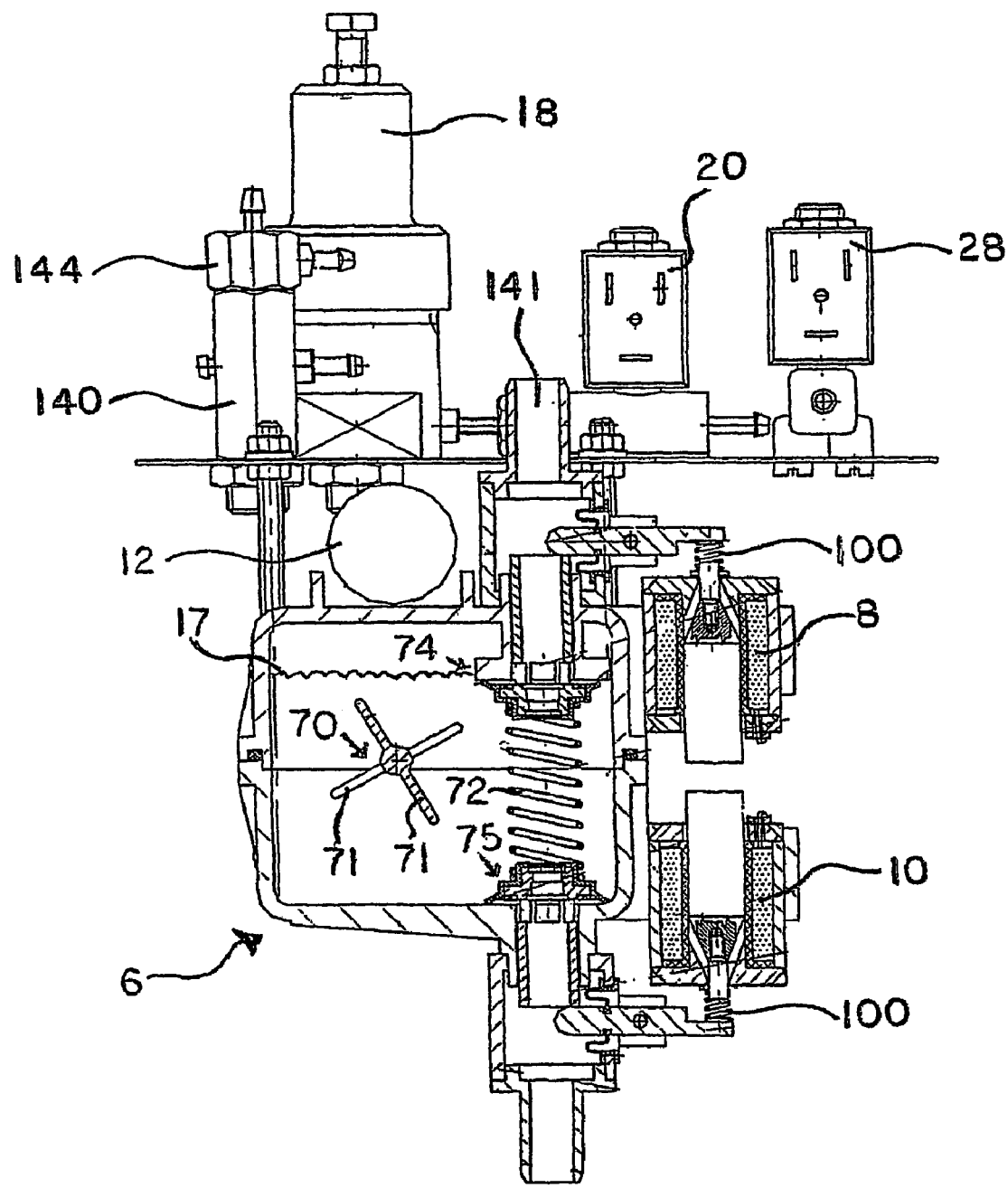
FIG. 6 is an enlarged cross-sectional view of a carbonation chamber used with the carbonation system.
Figure 6A:
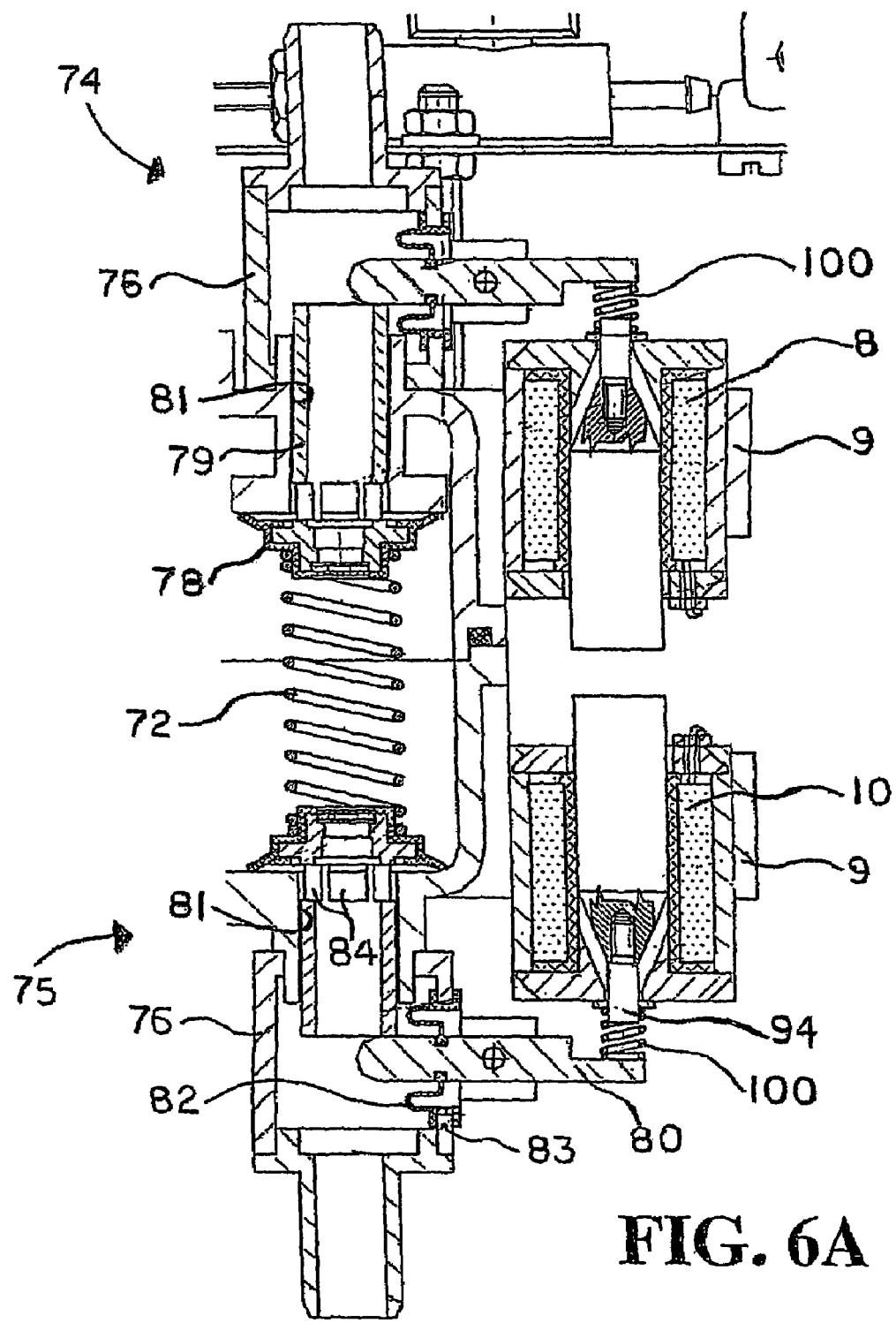
FIG. 6A is an enlargement of a portion of FIG. 6, illustrating the details of the liquid inlet and carbonated liquid dispensing valves.
Figure 7:
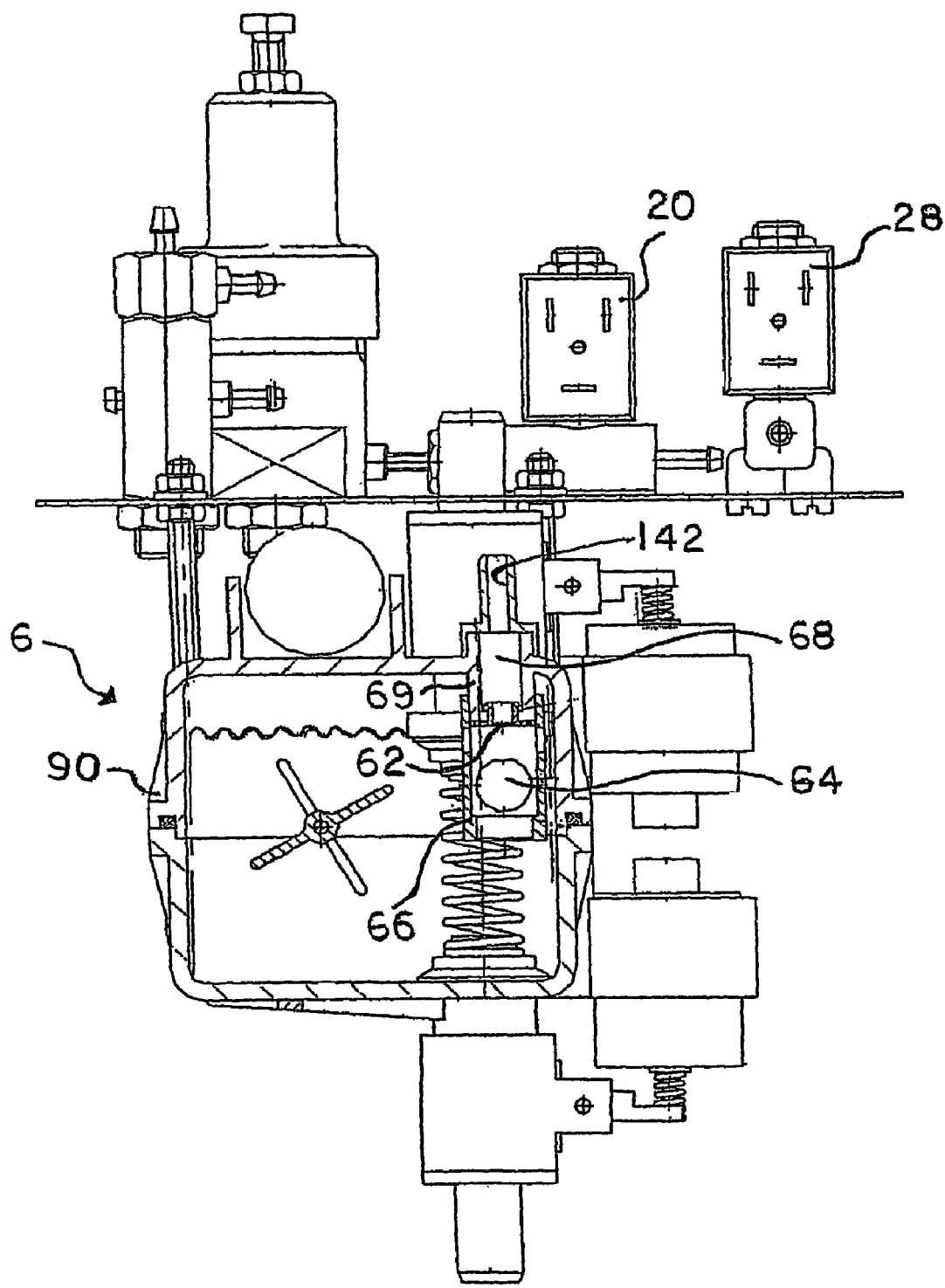
FIG. 7 is an enlarged partial cross-sectional view of the carbonation chamber used with the carbonation system.

An embodiment of the carbonation chamber 6 is depicted in FIGS. 6, 6A and 7, and is symmetrically designed for ease of manufacture. In this configuration, the water filling and the discharge of carbonated water is realized with a water inlet valve 74 and a water dispensing valve 75 that have identical parts and a common valve spring 72. As shown in FIGS. 6, 6A and 7, water inlet valve 74 introduces water into an upper part of carbonation chamber 6. There are identical flexible seals 78, valve arms 80, flexible seals 82, and water filing and draining solenoids 8, 10. This symmetrical design allows for easy production and assembling of parts. Also, a tight internal valve area is created by adhering the water filling and draining valves 74, 75 to the carbonation chamber 6. The adhesive may be specially designed for polycarbonate material. This adhesive ensures a strong bond with the polycarbonate material, thus the binding strength is nearly identical with that of the basic material. Carbonation chamber 6 has two brackets 9 for holding solenoids 8, 10.

Each water or liquid valve 74, 75 has a flexible seal 78 that seals against an inner surface of the carbonation chamber 6 about an aperture 81 formed through a wall of carbonation chamber 6. The aperture 81 can extend both inwardly and outwardly from the wall of carbonation chamber 6, forming a tube-like extension. A valve housing 76 is attached to the outward extension of aperture 81. Valve housing 76 may be formed as part of carbonation chamber 6. A movable valve sleeve 79 fits within the tube-like extension of aperture 81 and has a plurality of circumferentially spaced apertures 84 formed through an inner end. Apertures 84 permit the flow of liquid through the water valve 74, 75 when valve sleeve 79 lifts flexible seal 78 away from the adjacent surface of carbonation chamber 6.

Spring 72 biases flexible seal 78 and valve sleeve 79 to a closed position. Preferably, water inlet valve 74 is positioned vertically above water dispensing valve 75 so that a single spring 72 can be used to bias both valves 74, 75 to the closed position.

Valve housing 76 has an aperture 83 formed in its side surface. Valve arm 80 is pivotally connected to valve housing 76 and extends through aperture 83. A flexible sleeve 82 fits around valve arm 80 to seal valve arm 80 to aperture 83. A pusher rod 94 on solenoid 8, 10 pushes valve arm 80 when solenoid 8, 10 is energized, causing valve arm 80 to pivot, lifting valve sleeve 79 and flexible seal 78 to permit flow of liquid through water valve 74, 75.

Further, the carbonation chamber 6 of FIGS. 6 and 7 may be made of transparent polycarbonate, giving it a pleasing aesthetic appearance. This transparent material also allows the user to view the contents of the carbonation chamber 6 and therefore denote more rapidly if there is a malfunction or problem with the carbonation process. However, the carbonation chamber 6 needs to withstand a predetermined maximum pressure, such as an approximately 5.5 bar operating pressure, and it may therefore have bracing ribs or reinforcing supports 90 provided to increase the structural integrity of the unit. These ribs 90 add support to the outer structure of the carbonation chamber 6, allowing it to bear the maximum operating pressure. Pressure resistance of the bracing ribs 90 may provide integrity well beyond the maximum operating pressure to ensure safety.

The partial cross-section shown in FIG. 7 illustrates the carbonation chamber 6 and a vent/check valve 68. Vent/check valve 68 vents air from carbonation chamber 6 via exhaust 142 while the carbonation chamber 6 is being filled with water; prevents water and/or carbon dioxide gas from being vented from carbonation chamber 6 when pressurized with carbon dioxide gas; and permits air to flow into carbonation chamber 6 when carbonated water is being dispensed. Vent/check valve 68 includes a housing 69, which may be formed as part of carbonation chamber 6. Housing 69 extends inwardly from an aperture formed in a wall of carbonation chamber 6. A ball seat 62 fits into housing 69. A ball cage 66 with a floating ball 64 therein is attached to a lower end of housing 69. As water is introduced into carbonation chamber 6, air vents through vent/check valve 68 until floating ball 64 rises and seats against ball seat 62 closing vent/check valve 68. This prevents discharge of carbon dioxide gas when carbonation chamber 6 is pressurized with carbon dioxide gas. The water level in carbonation chamber 6 is controlled by the vent/check valve 68.

Carbonation chamber 6 is filled with water to the predetermined water level 17, which is set for a 4:1 ratio of water volume to the carbon dioxide gas volume above the water volume. This ratio ensures both economical use of the water and the discharge of a minimum amount of waste water during release of the gas pressure after mixing.

Figure 10:
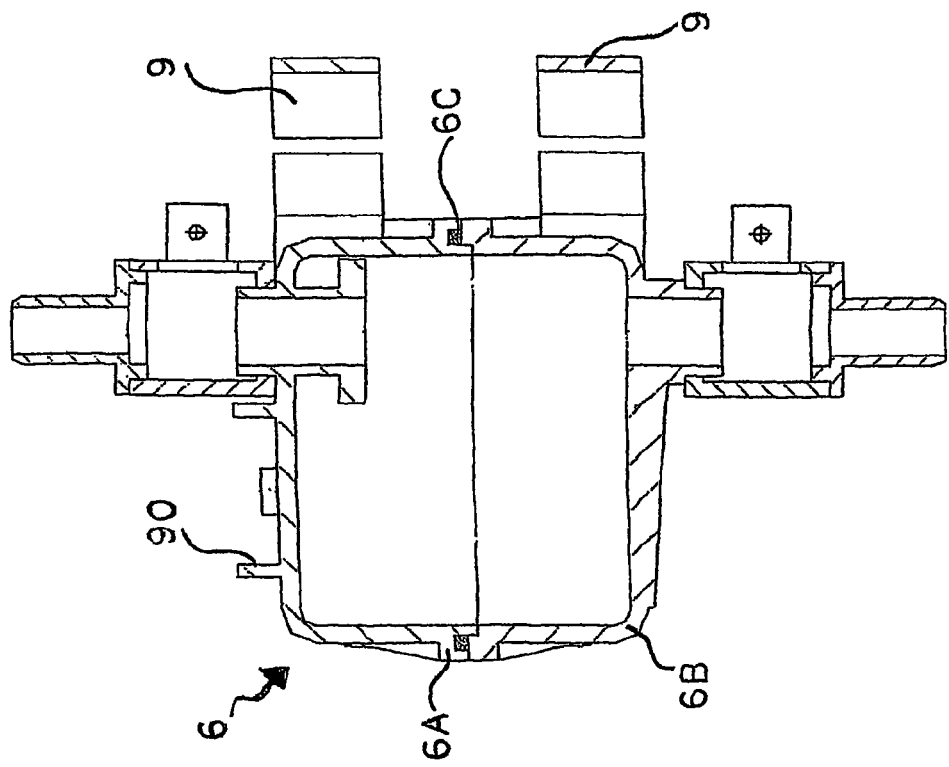
FIG. 10 is a cross-sectional view of the carbonation chamber with the internal components removed.

Carbonation chamber 6 has a rectangular design, and, preferably, a square design, as shown in FIGS. 6, 7 and 10. Therefore, when mixing is done with a horizontally rotatable bladed stirrer 70, the square design of carbonation chamber 6 creates more agitation, thus mixing the solution faster and more thoroughly. Overall, the carbonation chamber 6 consists of upper 6a and a lower 6b parts (See FIG. 10), with a profiled silicon seal 6c sealing the two parts. The upper and lower parts 6a, 6b of the carbonation chamber 6 are connected by threaded bars and secured with nuts. The same threaded bars are used to resiliently attach the entire carbonation chamber 6 to the housing 42 of the carbonated water cooler 32.

Figure 9:
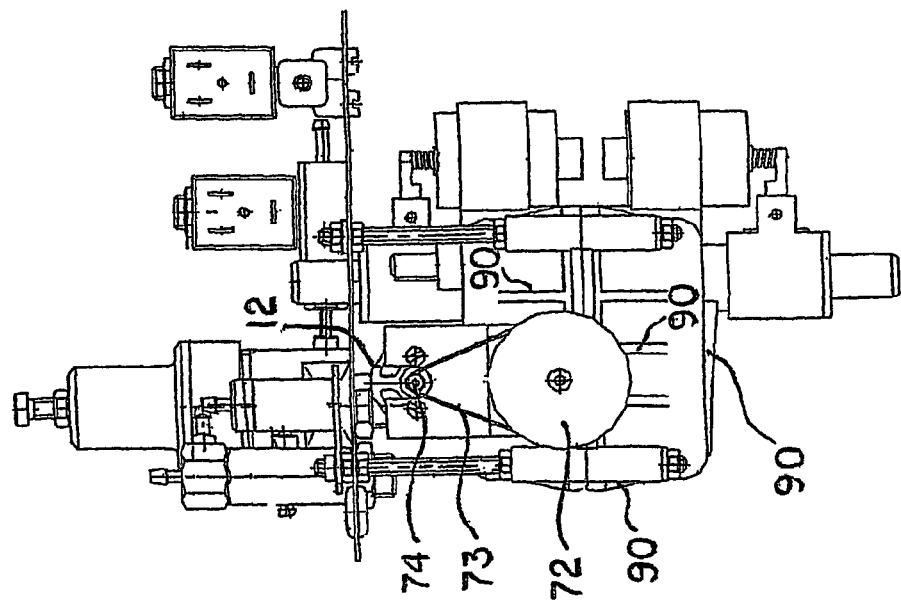
FIG. 9 is a side view of the carbonation chamber and associated components.

Preferably, bladed stirrer 70 has a plurality of spaced apart blades 71 extending from a horizontal shaft. Bladed stirrer 70 is connected to motor 12 by gear 72 driven by a belt 73 that is driven by a smaller gear 74 connected to motor 12 (See FIG. 9).

Figure 8:
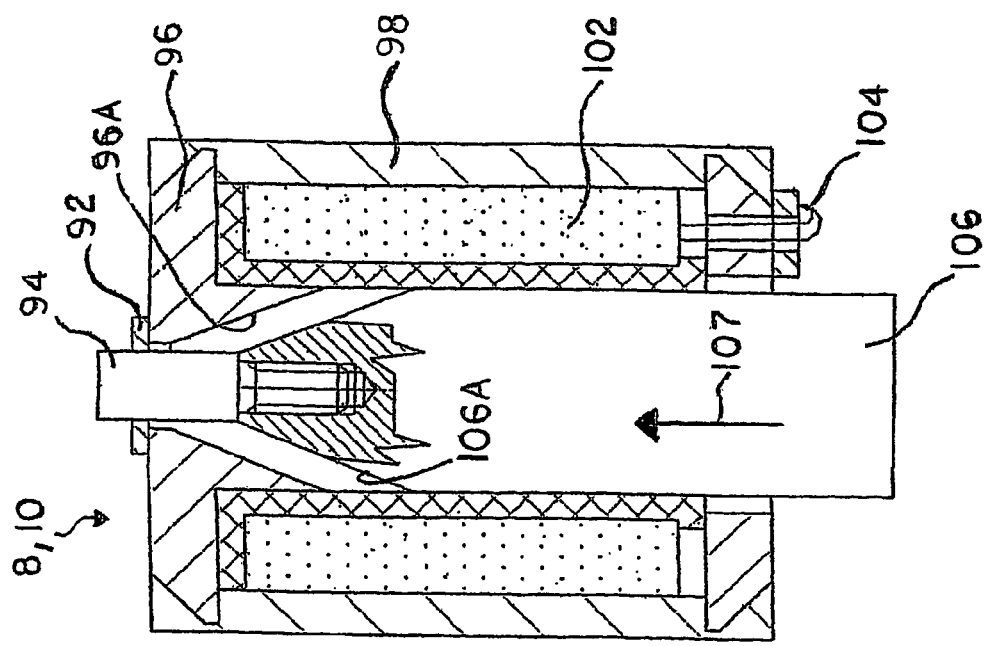
FIG. 8 is an enlarged cross-sectional view of a solenoid used with the liquid inlet and carbonated liquid dispensing valves.

The water filling and draining solenoids 8, 10 are illustrated in a de-energized position in FIG. 8. Each solenoid 8, 10 has a movable cylindrical plunger 106 having a cone shape 106a at one end. The movable plunger 106 is positioned within a housing 98 that encloses electrical coils 102. The electrical coils are connected to the control system by an electrical connector 104. An end plate 96 is attached to one end of housing 98. End plate 96 has a cone shaped aperture 96a, which has a complementary size and shape to the conical end 106a of plunger 106. A pusher rod 94 is attached to the conical end 106a of plunger 106 and extends through conical aperture 96a. A stop ring 92 is attached to the free end of pusher rod 94 to prevent pusher rod 94 from passing through conical aperture 96a. A spring 100 (See FIGS. 6, 6A) biases plunger 106 to the de-energized position (shown in FIG. 8). Energizing coils 102 causes plunger 106 to move in the direction of arrow 107 and extends pusher rod 94 further from end plate 96. The water filling and draining solenoids 8, 10 were specially developed for the amount of space available in the carbonation system 32. They may be made of steel, with tension-relieving heat treatment and zinc passivation surface protection. Therefore, the solenoids can withstand normal operating procedures of 24V DC without over-heating for repeated cycles. The cone seal design of the magnetic element and case ensure proper travel of the solenoid 8, 10.

Figure 11:
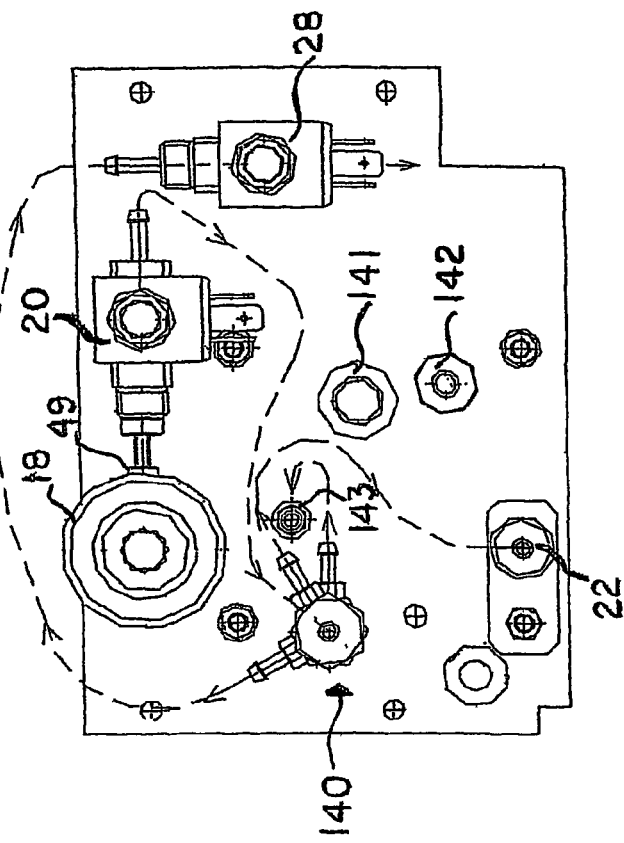
FIG. 11 is a schematic view illustrating the fluid connections between some of the carbonation system components.

A gas manifold 140 (See FIGS. 6 and 11) is provided to connect the pressure sensor 22, the carbon dioxide gas inlet solenoid valve 20, the pressure safety valve 24, the non-return valve 26 and the exhaust gas solenoid valve 28 to the carbonation chamber 6. The pressure safety valve 24 and non-return valve 26 are, preferably, both contained in a fitting 144 connected to the top of gas manifold 140. Also shown in FIG. 11 are the inlet 141 to the water inlet valve 74, the vent connection 142 for the vent/check valve 68 and the gas inlet 143 to the carbonation chamber 6 from gas manifold 140. The low pressure gas outlet 49 from pressure regulator 18 is connected to carbon dioxide gas inlet solenoid valve 20, which is then connected to an inlet of gas manifold 140. A first outlet of gas manifold 140 connects to the carbonation chamber inlet 143. A second outlet of gas manifold 140 connected to pressure sensor 22. A third outlet of gas manifold 140 is connected to exhaust gas solenoid valve 28.

Figure 12:
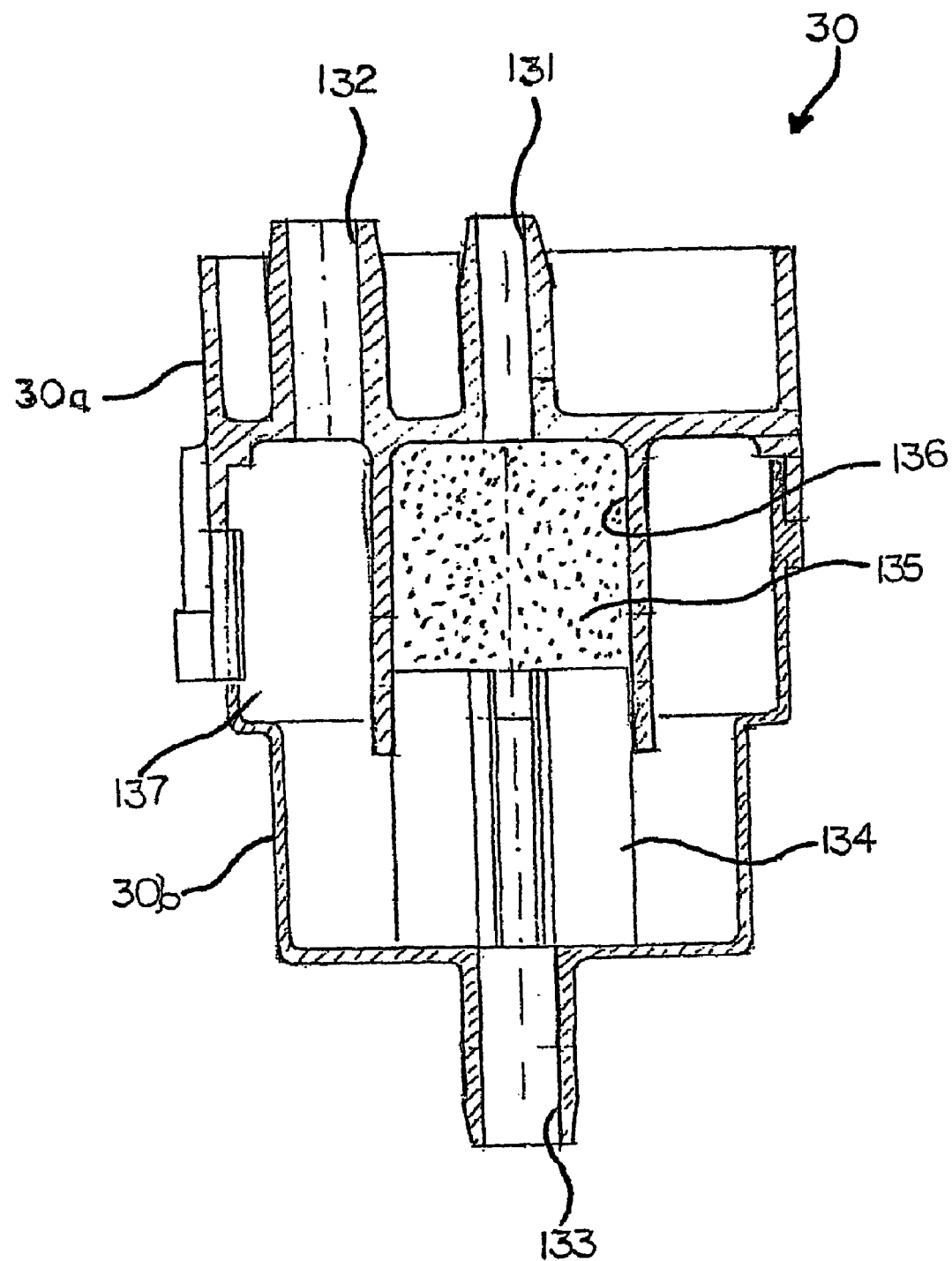
FIG. 12 is an enlarged cross sectional view of a gas silencer used with the carbonation system.

FIG. 12 shows a cross section of gas silencer 30. Silencer 30 is formed from a two piece housing, an upper housing 30a and a lower housing 30b. Upper housing 30a has two inlets, a water inlet 132, which receives excess water from carbonation chamber 6 via vent connection 142, and a gas inlet 131, which receives vented carbon dioxide gas from exhaust solenoid valve 28. The upper housing includes at least one internal cavity 136 filled with a twisted polyester filter 135. Preferably, the upper housing is divided into a central internal cavity 136, which receives the vented gas via gas inlet 131 and an outer internal cavity 137, which surrounds the central internal cavity 137 and receives the excess water via water inlet 132. The twisted polyester filter 135 may fill both cavities 136, 137, or only the central internal cavity as shown in FIG. 12. A plurality of radially extending circumferentially spaced apart vanes 134 are provided in lower housing 30a positioned around an outlet 133. Outlet 133 drains to drip tray 38. Vanes 134 support filter 135. In operation, excess water and vented excess gas enter the silencer 30 through inlets 132 and 131 respectively and then mix and depressurize (expand) in the cavities 136, 137 where the twisted polyester filter 135 is positioned. Water then exits the silencer 30 by gravity through outlet 133 to drip tray 38.

Production of carbonated water is done according to the following sequence:

After the cycle is initiated by operating one of the carbonation level switches, high carbonation or low carbonation, water inlet valve solenoid 8 is energized for about 6 seconds opening water inlet valve 74 filling carbonation chamber 6 to the predetermined level 17. (The carbonation chamber 6 typically fills to the predetermined level in about 4 seconds.).

The carbon dioxide gas filling solenoid valve 20 is opened, allowing carbon dioxide gas to flow into the carbonation chamber 6, pressurizing the carbonation chamber 6 to about 5 bar.

About 0.5 second after carbon dioxide gas filling solenoid valve 20 opens, mixing motor 12 operates to rotate bladed mixer 70, provided pressure sensor 22 detects gas pressure in carbonation chamber 6.

Mixing motor 12 operates for about 7 second for high carbonation and about 4 seconds for low carbonation.

While mixing motor 12 is operating, additional carbon dioxide gas is added as pressure sensor 22 detects a drop in gas pressure.

After the mixing time (7 seconds or 4 seconds) completes, motor 12 is stopped and carbonation chamber 6 is allowed to settle for about 2 seconds.

After the 2 second delay, exhaust solenoid valve 28 is energized, relieving the gas pressure from the carbonation chamber 6 through silencer 30.

After the pressure is relieved from carbonation chamber 6, water dispensing valve 75 opens draining carbonated water into a 2 dl container in about 6 seconds.

The overall cycle time is about 24 seconds for high carbonation and 21 seconds for low carbonation.

Although the principles, preferred embodiments and preferred operation of the present invention have been disclosed in detail herein, this is not to be construed as being limited to the particular illustrative forms disclosed. It will thus become apparent to those skilled in the art that various modifications of the preferred embodiments herein can be made without departing from the spirit or scope of the invention as defined by the appended claims.

The invention claimed is:

1. A carbonation apparatus comprising:
   a carbonation chamber;
   a source of water;
   a water inlet valve connecting the source of water to the carbonation chamber;
   a source of carbon dioxide gas;
   a carbon dioxide inlet valve connecting the source of carbon dioxide gas to the carbonation chamber;
   a rotatable mixer within the carbonation chamber;
   a gas exhaust valve connected to the carbonation chamber;
   a gas exhaust silencer connected to the gas exhaust valve, the gas exhaust silencer comprising a housing having at least one inlet and one outlet, the housing having an internal cavity with a filter therein, the internal cavity being in fluid communication with a first inlet, the first inlet receiving gas being relieved from the carbonation chamber, the outlet being in fluid communication with the first inlet and receiving gas after the gas passes through the filter, wherein the housing has at least two inlets, a second inlet receiving water vented from the carbonation chamber, the vented water being mixed with the relieved gas, the outlet receiving the mixed water and gas; and
   a carbonated water dispensing valve connected to the carbonation chamber.

2. The carbonation chamber according to claim 1, further comprising:
   a controller for selectively operating: the carbon dioxide inlet valve; the gas exhaust valve; the water inlet valve; the carbonated water dispensing valve; and the mixer.

3. The carbonation chamber according to claim 1, wherein the carbonation chamber is rectangular.

4. The carbonation chamber according to claim 1, wherein the water inlet valve and the carbonated water dispensing valve are positioned within the carbonation chamber.

5. A method for carbonating water comprising the steps of:
   partially filling a carbonation chamber with water to a pre-determined level;
   introducing carbon dioxide gas into the carbonation chamber;
   agitating the water to mix carbon dioxide gas into the water;
   relieving gas pressure from the carbonation chamber prior to dispensing carbonated water from the carbonation chamber;
   silencing the gas pressure being relieved from the carbonation chamber; and
   dispensing carbonated water from the carbonation chamber,
   wherein the step of partially filling a carbonation chamber with water comprises introducing water into the carbonation chamber directly over where the carbonated water is dispensed from the carbonation chamber.

6. The method according to claim 5, further comprising maintaining the pressure of the carbon dioxide gas in the carbonation chamber while agitating the water.

7. The method according to claim 5, wherein the step of partially filling a carbonation chamber introduces the water into an upper portion of the carbonation chamber.

8. The method according to claim 5, further comprising:
   selecting one of a first carbonation level and a second carbonation level.

9. The method according to claim 5, wherein the carbon dioxide gas is introduced above the water.

10. A method for carbonating water comprising the steps of:
    partially filling a carbonation chamber with water to a pre-determined level;
    introducing carbon dioxide gas into the carbonation chamber;
    agitating the water to mix carbon dioxide gas into the water;
    relieving gas pressure from the carbonation chamber prior to dispensing carbonated water from the carbonation chamber;
    silencing the gas pressure being relieved from the carbonation chamber;
    dispensing carbonated water from the carbonation chamber;
    venting excess water from the carbonation chamber; and
    mixing the vented excess water and the relieved gas during the step of silencing.

11. A method for carbonating water comprising the steps of:
    partially filling a carbonation chamber with water to a pre-determined level;
    introducing carbon dioxide gas into the carbonation chamber;
    agitating the water to mix carbon dioxide gas into the water;

relieving gas pressure from the carbonation chamber prior to dispensing carbonated water from the carbonation chamber;
silencing the gas pressure being relieved from the carbonation chamber;
dispensing carbonated water from the carbonation chamber;
beginning the step of agitating the water about 0.5 seconds after beginning the step of introducing carbon dioxide gas into the carbonation chamber; and
after beginning the step of agitating the water, simultaneously performing the steps of agitating the water and introducing carbon dioxide gas into the carbonation chamber.

12. A carbonation apparatus comprising:
a carbonation chamber;
means for partially filling the carbonation chamber with water to a pre-determined level;
means for introducing carbon dioxide gas into the carbonation chamber above the water;
means for, mounted within the carbonation chamber, agitating the water to mix carbon dioxide gas into the water; and
means for dispensing carbonated water from the carbonation chamber, the means for partially filling and the means for dispensing including combined filling and dispensing valves.

13. The carbonation apparatus according to claim 12, wherein the water partially filling the carbonation chamber is introduced into an upper part of the carbonation chamber.

14. The carbonation apparatus according to claim 12, wherein the means for introducing carbon dioxide gas comprises:
a source of carbon dioxide gas; and
a pressure regulator regulating the pressure of the carbon dioxide gas introduced into the carbonation chamber.

15. The carbonation apparatus according to claim 14, wherein the pressure regulator regulates the pressure of the carbon dioxide gas to about 5 bar.

16. The carbonation apparatus according to claim 12, wherein the means for filling and the means for dispensing are water valves comprising:
a flexible seal sealingly engaging an interior surface of the carbonation chamber;
a valve sleeve movable between a first position and a second position, the valve sleeve, when in the second position, lifting the flexible seal out of engagement with the interior surface of the carbonation chamber, the flexible seal fitting over an interior end of the valve sleeve; and
a spring biasing the valve sleeve to the first position.

17. The carbonation apparatus according to claim 16, wherein the carbonation chamber has a through aperture therein, an aperture side being elongated forming a valve housing, the valve sleeve being positioned within the aperture, the flexible seal sealing about an inner end of the aperture.

18. The carbonation apparatus according to claim 17, further comprising:
a solenoid operatively connected to the valve sleeve, the solenoid moving the valve sleeve from the first position to the second position; and wherein the aperture side has an operator aperture therein, a pivotable arm extends from the solenoid through the operator aperture to the valve sleeve, and a second flexible sleeve seals the pivotable arm to the operator aperture.

19. The carbonation apparatus according to claim 12, further comprising:
a single spring biasing both valve sleeves to the first position.

20. The carbonation apparatus according to claim 12, wherein the means for partially filling the carbonation chamber with water introduces the water vertically above where the means for dispensing carbonated water from the carbonation chamber removes the carbonated water from the carbonation chamber.

21. A carbonation apparatus comprising:
a carbonation chamber;
a source of water;
a water inlet valve connecting the source of water to the carbonation chamber;
a source of carbon dioxide gas;
a carbon dioxide inlet valve connecting the source of carbon dioxide gas to the carbonation chamber;
a rotatable mixer within the carbonation chamber;
a gas exhaust valve connected to the carbonation chamber;
a gas exhaust silencer connected to the gas exhaust valve; and
a carbonated water dispensing valve connected to the carbonation chamber; and
a spring, the spring biasing both the water inlet valve and the carbonated water dispensing valve towards a closed position.

22. A carbonation apparatus comprising:
a carbonation chamber;
a source of water;
a water inlet valve connecting the source of water to the carbonation chamber;
a source of carbon dioxide gas;
a carbon dioxide inlet valve connecting the source of carbon dioxide gas to the carbonation chamber;
a rotatable mixer within the carbonation chamber;
a gas exhaust valve connected to the carbonation chamber;
a gas exhaust silencer connected to the gas exhaust valve, the gas exhaust silencer comprising a housing having at least one inlet and one outlet, the housing having an internal cavity with a filter therein, the internal cavity being in fluid communication with a first inlet, the first inlet receiving gas being relieved from the carbonation chamber, the outlet being in fluid communication with the first inlet and receiving gas after the gas passes through the filter, the housing further comprising a second inlet, the second inlet receiving water vented from the carbonation chamber, the outlet being in fluid communication with the first inlet and the second inlet; and
a carbonated water dispensing valve connected to the carbonation chamber.

23. A method for carbonating water comprising the steps of:
partially filling a carbonation chamber with water to a pre-determined level;
introducing carbon dioxide gas into the carbonation chamber;
agitating the water to mix carbon dioxide gas into the water;
relieving gas pressure from the carbonation chamber prior to dispensing carbonated water from the carbonation chamber;
silencing the gas pressure being relieved from the carbonation chamber;

dispensing carbonated water from the carbonation chamber; and delaying the step of relieving gas pressure for about 2 seconds after the step of agitating the water completes.

24. A carbonation apparatus comprising:
a carbonation chamber;
a source of water;
a water inlet valve connecting the source of water to the carbonation chamber;
a source of carbon dioxide gas;
a carbon dioxide inlet valve connecting the source of carbon dioxide gas to the carbonation chamber;
a rotatable mixer within the carbonation chamber;
a gas exhaust valve connected to the carbonation chamber;
a gas exhaust silencer connected to the gas exhaust valve; and
a carbonated water dispensing valve connected to the carbonation chamber, wherein the water inlet valve and the carbonated water dispensing valve are coaxial.

* * * * *